United States Patent [19]

Satterlund et al.

[11] Patent Number: 5,602,902
[45] Date of Patent: Feb. 11, 1997

[54] FOUR WIRE MODEM SIGNAL SWITCHING FOR VOICE AND DATA APPLICATIONS

[75] Inventors: Nels E. Satterlund, Loomis; Glenn M. Lewis, Fairoaks, both of Calif.

[73] Assignee: Intel Corporation, Santa Clara, Calif.

[21] Appl. No.: 410,212

[22] Filed: Mar. 24, 1995

[51] Int. Cl.[6] ..................................................... H04Q 7/32
[52] U.S. Cl. ................... 379/59; 379/98; 375/222
[58] Field of Search ................................ 379/58, 59, 93, 379/96, 98; 375/222

[56] References Cited

U.S. PATENT DOCUMENTS

| | | | |
|---|---|---|---|
| 4,691,342 | 9/1987 | Waldron et al. | 379/98 |
| 4,972,457 | 11/1990 | O'Sullivan | 379/59 |
| 5,353,334 | 10/1994 | O'Sullivan | 379/59 |
| 5,386,438 | 1/1995 | England | 375/222 |
| 5,408,520 | 4/1995 | Clark et al. | 379/93 |
| 5,453,986 | 9/1995 | Davis et al. | 379/202 |

OTHER PUBLICATIONS

Radish Communications Systems, Inc., The VoiceView Company pp. 1–7, Introduction to VoiceView, Apr. 1995.
New Cardinal Voice–Capable Modems Offer Innovative Telephony Solution, pp. 1–5, Cardinal Technologies, Aug. 1995.
Radish and NEC Sign License Agreement, pp. 1–2, Radish Communications Systems, Aug. 1995.
Boca Research Shipping First VoiceView Certified Modem, pp. 1–3, Boca Research, Inc., Apr. 1995.
AST and Radish Combine Forces To Develop A Breakthrough In The Way PC Companies Support Their Customers, pp. 1–3, AST Computer, Jun. 1995.

*Primary Examiner*—Dwayne D. Bost
*Attorney, Agent, or Firm*—Blakely, Sokoloff, Taylor & Zafman

[57] ABSTRACT

A switching multi-mode modem that switches on the four wire side of the DAA where the two-wire side of the DAA is connected to a land based telephone network. The modem includes a DAA, a first DSP capable of performing all modem digital signal processing functions and a second DSP capable of performing conversion and compression of analog voice signals to digital signals. The modem includes a headset connector and a cellular telephone connector and a switching network connected between the first DSP, the second DSP, the four-wire side of the DAA, the cellular telephone connector and the headset connector. The modem further contains a microcontroller which is connected to the first DSP and the second DSP and the switching network and separates audio signals from data signals and causes the switching network to switch into states that configure the modem to operate in one of the following states: Radish voice mode, or a Radish data mode, or a cellular telephone mode, or a business/audio mode or a digital simultaneous voice and data mode upon command from said microcontroller.

12 Claims, 9 Drawing Sheets

FOUR WIRE MODEM SIGNAL SWITCHING FOR VOICE AND DATA APPLICATIONS

FIELD OF THE INVENTION

The present invention relates to modems. More particularly it relates to switching systems for multiple function modems.

DESCRIPTION OF THE PRIOR ART

The early transmission of digital data between computers over the telephone network used a device-called a modem-that converts between a computer's digital signals and signals that can be carried on the telephone network's limited bandwidth analog transmission lines.

Early modems (the term modem stands for MOdulator DEModulator) were acoustically coupled to a telephone handset. Their sole function was to accomplish the conversion process. They did not dial or switch modes, where mode switching initially meant changing between voice and data. Rather, the user dialed the telephone number, and after a connection was made, put the receiver in an acoustical coupler which was the interface between the modem's electronics and the telephone handset. All modem communication over the telephone network went first through the telephone handset which contained considerable specialized circuitry including an isolation device known as a data access arrangement ("DAA"). To switch from data to voice, the user merely picked up the receiver out of the acoustical coupler.

Early modems were notoriously unreliable and slow due to the telephone system that was designed for voice rather than data. A poor connection which would nonetheless work for a voice communication was unworkable for data. As a result, extensive error correction and adaptive channel compensation features were added to modems. These features improved reliability; however, they slowed the communications process down. For example, each time modems on either end of a telephone wire make a data connection, they establish signal channel distortion compensation which involves sending test signals back and forth that are monitored for distortion and adjusting the receiving modem's electronics to compensate. This process requires considerable time. And each time there is a switch of mode, a new connection was made.

Later, modems were developed which switched modes in response to a control signal. This switching feature was electrically the same as was previously done by hand. Thus, the data connection was still broken. Later still, additional modes were added. In this context, the term mode refers to a set of features. That is, when a system is switched to a mode, the system will implement the features called for by the mode. In today's modern modems, it is desirable to be able to switch to several modes. Some modes are desired to maintain compatibility with old equipment. Yet other modes add new and desirable features. At least the following modes are desirable:

Telephone Mode which is sometimes referred to as plain old telephone systems ("POTS"): A user may wish to use the PC as a conventional telephone. That is, a PC is used to dial the telephone number, but when the other party picks up, the user merely wants to have a voice conversation over the telephone network. The user will just talk into the PC. Of Course the PC must have a microphone and speaker. The keyboard or a stored number is used to dial.

Cellular Mode: The cellular mode allows connection of a modem to a cellular telephone. A DAA is not required; however, a special interface which is different than a conventional telephone wire is required.

Business Audio: The business audio mode focuses on using a personal computer ("PC") an answering machine. This means that the PC must act as a tape recorder and play back messages. This requires the ability to get an audio signal in and out of the PC in a digitized format. That is, (1) an announcement must be recorded for later playback to incoming callers; (2) incoming messages must be recorded from either a POTS line or the cellular telephone system; and (3) messages that have been recorded must be played back.

Digital Simultaneous Voice and Data ("DSVD"): In this mode, once a data connection is made, the user can pick up the telephone hand set and talk to the other party without breaking the data connection. With DSVD, a combined digital voice and data signal comes into the modem, the modem microprocessor separates the voice and data, sends the data to the computer and sends the voice back out to be decoded and sent to a headset so that it can be heard. This requires an additional DSP. The second DSP decodes the audio while the first DSP is processing the modem data. A low speed analog SVD has also been commercialized, but uses the telephone as the voice I/O.

Finally, a modern modem must be able to support other industry standards. Of the other industry standards, "Voice View" a protocol developed and published by the Radish Company (commonly called and hereafter referred to as "Radish") is the most widely used. Thus the system must be able to emulate Radish switching such that if the system is talking to a second modem that only supports Radish, the system can also support Radish.

Figure 1:
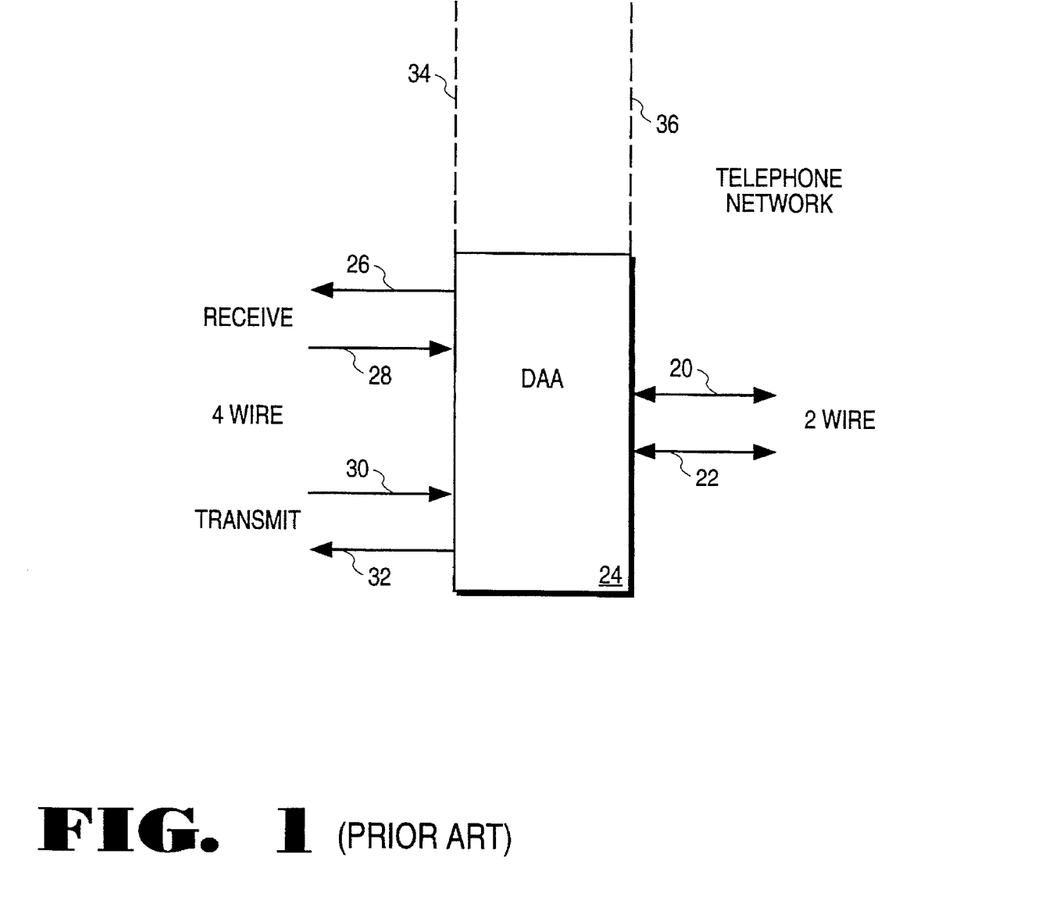
FIG. 1 is a block diagram of a basic DAA showing its basic functions.

Because modems connect to conventional telephone wires, they must conform to the requirements of the telephone network. One such requirement is that all equipment connected to the network must be isolated by an interface device. The DAA performs this function. A conventional telephone line consists of two bi-directional wires. These wires come into one side of the DAA. On the other side of the DAA there are 4 wires: an outgoing wire, an incoming wire and a return wire for each. FIG. 1 is a block diagram of a DAA. Referring now to FIG. 1, wires 20 and 22 are bidirectional telephone wires. That is, they are in the telephone network. DAA 24 transforms telephone network wires 20 and 22 into a set of receive wires 26 and 28 and into a set of transmit wires 30 and 32. Lines 26–32 are unidirectional lines with one wire for signal and one for ground. This configuration is useful for echo cancellation. The telephone handset side of the DAA is known in the industry as the 4 wire point and is indicated by reference numeral 34. The telephone network side of the DAA is known in the industry as the two wire point and is indicated by reference numeral 36. A DAA is in every telephone base unit and every modem.

Figure 2:
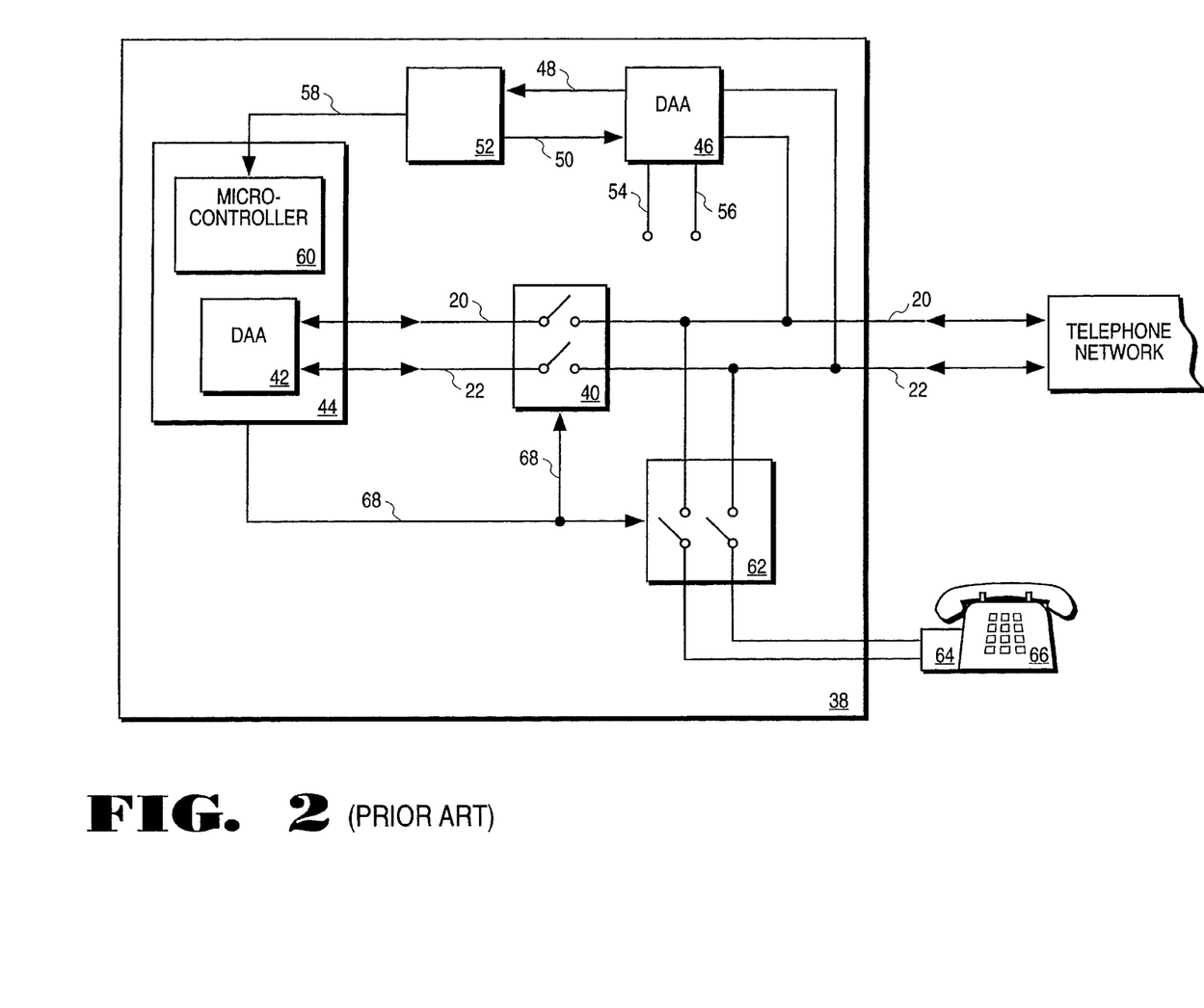
FIG. 2 is a block diagram of a prior art modem system with switching between voice and data in response to a control signal when a modem is connected to a telephone line.

FIG. 2 is a block diagram of a prior art modem system with switching in response to a control signal as defined by the Radish standard. Referring to FIG. 2, reference numeral 38 refers to the system that includes a modem and switching. Telephone wires 20 and 22 are connected through a first set of switches 40 to a first DAA 42 located in modem 44. A second DAA 46 is connected directly to wires 20 and 22. Receiving wires 48 and 50 of DAA 46 are connected to a detector 52. Transmit wires 54 and 56 of DAA 46 are not used. DAA 46 provides isolation for access by detector 52 to telephone wires 20 and 22. Detector 52 looks for a signal sent by the sending modem that indicates that the next signal will be data. Detector 52 sends a signal over wire 58 to the micro controller 60 of modem 44. One side of a second set of switches 62 is connected directly to telephone wires 20 and 22. The other side of switch set 62 is connected to DAA 64 in telephone hand set 66. Switches 40 and 62 are controlled by signals generated by microcontroller 60 and supplied over control wire 68 such that when switches 62 are closed, switches 40 are open and visa versa. In this system, all mode switching is done on the two-wire side of the DAA. This system requires 3 DAA's: 42, 46, and 64.

Another factor affecting modem design is the advent of mobile computer communications. For mobile modem applications, a user cannot be expected to carry a conventional handset around. Yet, the conventional handset has much of the telephone interface circuitry built into it—particularly the DAA. In addition, the PCMCIA standard has become the accepted form factor for mobile computing add-in functions. Thus, any modem design intended for mobile computing must be able to fit into one of the PCMCIA, Type form factors.

SUMMARY OF THE INVENTION

The present invention consists of a switching multi-mode modem that includes a DAA having a two-wire side and a four-wire side. The two-wire side of the DAA is connected to a land based telephone network. The modem includes a first DSP capable of performing all modem digital signal processing functions and a second DSP capable of performing conversion and compression of analog voice signals to digital signals. The modem includes a headset connector and a cellular telephone connector and a switching network connected between the first DSP, the second DSP, the four-wire side of the DAA, the cellular telephone connector and the headset connector. The modem further contains a microcontroller which is connected to the first DSP and the second DSP and the switching network and separates audio signals from data signals and causes the switching network to switch into states that configure the modem to operate a plurality of separate modes.

The switching network may consist of four switches. The first of such switches has a base terminal connected to the input of the first digital signal processor and mutually exclusively connectable to three switchable terminals. The first switchable terminal is connected to the output of the cellular telephone. The second switchable terminal is connected to the output of the four wire side of the DAA. The third switchable terminal is connected to the output of the headset. The second of such switches has a base terminal connected to the input of the four wire side of the DAA and mutually exclusively connectable to two switchable terminals. The first switchable terminal is connected to the output of the first digital signal processor and the second switchable terminal is connected to the output of the headset. The third of such switches has a base terminal connected to the input of the headset and mutually exclusively connectable to three switchable terminals. The first switchable terminal is connected to the output of the first digital signal processor. The second switchable terminal is connected to the output of the second digital signal processor. The third switchable terminal is connected to the input of the vase terminal of the first switch. The fourth of such switches has a base terminal connected to the input of the cellular telephone and mutually exclusively connectable to two switchable terminals. The first switchable terminal is connected to the output of the headset and the second terminal of the second switch and the second switchable terminal is connected to the output of the first digital signal processor and to the first terminal of the second switch and to the first terminal of the third switch.

DETAILED DESCRIPTION OF THE INVENTION

Figure 3:
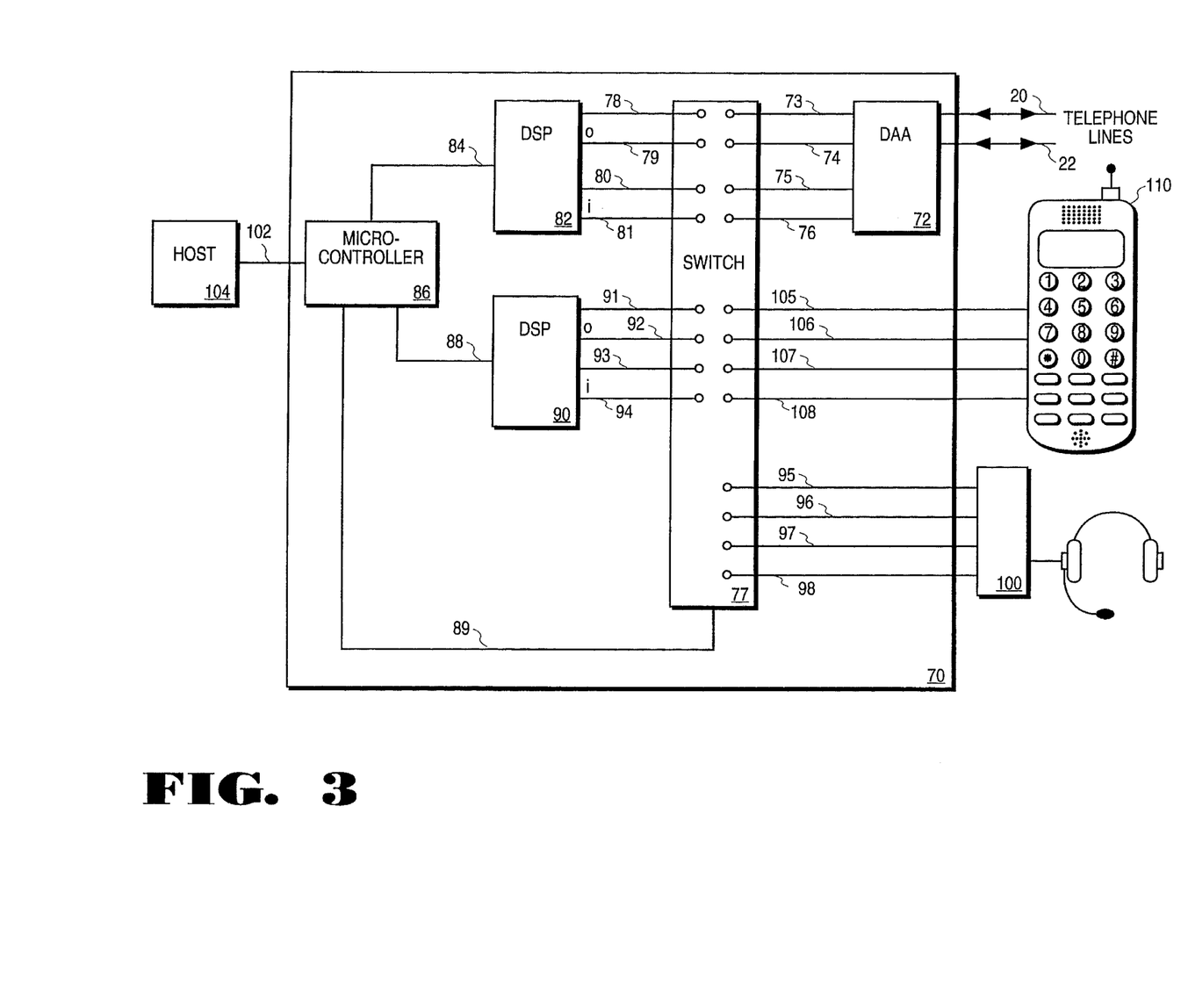
FIG. 3 is a block diagram of the basic system of the present invention connected to provide simultaneous voice and data features.

FIG. 3 is a block diagram of a system incorporating the features of the present invention. In FIG. 3, reference numeral 70 indicates the system generally. Telephone wires 20 and 22 lead into DAA 72 of system 70. Output wires 73 and 74 and input wires 75 and 76 connect the non-network side of DAA 72 with switch 77. Output wires 78 and 79 and input wires 80 and 81 connect switch 77 to DSP 82 which performs modem functions. The filtered and digitized signal is transmitted over data path 84 from DSP 82 to microcontroller 86 which may be a stand alone microcontroller or one built into the modem or it may be a host computer. Microcontroller 86 separates the audio from the data under firmware control and sends the audio portion over data path 88 to DSP 90 where it is converted back to analog. Microcontroller 86 is also connected to switch 77 over data path 89. DSP 90 is connected by output wires 91 and 92 and input wires 93 and 94 to switch 77. Output wires 95 and 96 and input wires 97 and 98 connect switch 77 with headset 100. Output wires 105 and 106 and input wires 107 and 108 connect switch 77 with cellular telephone 110. The signals between DSP 90 and headset 100 are bidirectional since full duplex voice is a requirement. A DAA is not needed in headset 100 because this is not a telephony application. That is, this part of the system is not connected to the telephone network. Data path 102 connects a host computer 104 with microcontroller 86 of modem 70.

The signals on wires 20 and 22 are analog voice and digital data encoded in analog modem format. The signals are bidirectional. Voice signals are generated by a microphone in headset 100 when the user speaks. Voice signals are also received and converted to sound by the speakers in headset 100. Thus analog audio signals are transmitted to and from headset 100. If originating in headset 100, the voice signals are digitized and compressed by DSP 90. They are then passed to microcontroller 86 where they are added to the data signal. This signal is then analog coded by DSP 82 and sent out through DAA 72 to the telephone network. When a voice signal comes in from the telephone system, microcontroller 86 strips off the analog portion and sends it to DSP 90 where it is converted to analog and passed to headset 100. DSP 90 performs voice digitizing and compression. DSP 82 performs modem functions. Both are controlled by microcontroller 86. The intelligence for the applications is in the application software of host 104. Modes may be selected by host 104 by sending commands to modem 70 by programming microprocessor 86 which in turn sets up DSPs 82 and 90 and switch 77 correctly.

Figure 4:
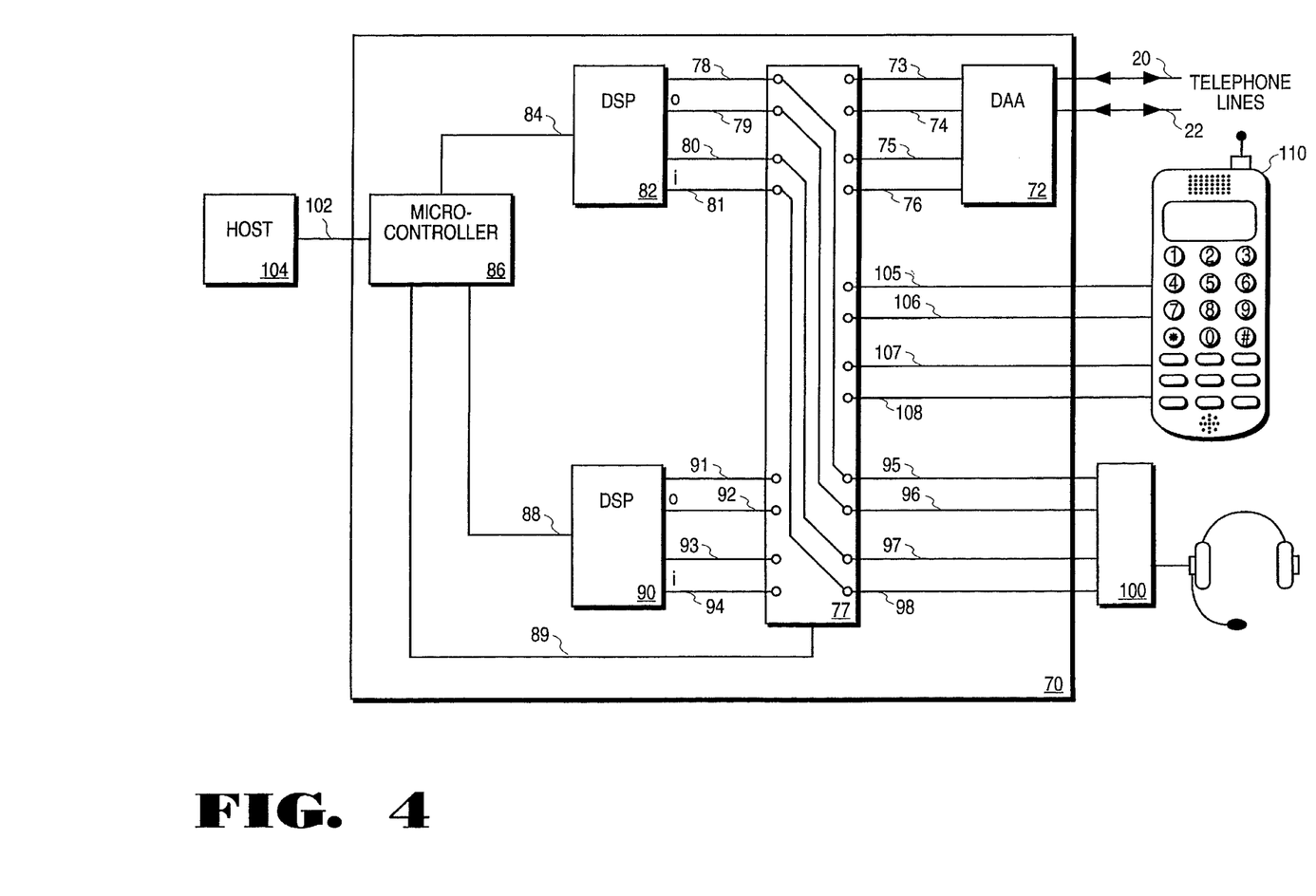
FIG. 4 is a block diagram of the system of the present invention when connected to provide business/audio mode features.

FIG. 4 is a block diagram of the system of the present invention when set up to provide business/audio mode features. The business audio features allow a PC to be used as an answering machine. That is, (1) announcement must be recorded for later playback to incoming callers; (2) incoming messages must be recorded from either a POTS line or the cellular telephone system; and (3) messages that have been recorded must be played back. DSP 82 has the same functionality as DSPs 82 and 90 together. For business audio however, the voice and data functions are typically not performed simultaneously and thus two DSP's are not required. That is, DSP 90 is not used since there is a large installed base of software that supports this function using only DSP 82. This means that switch 77 must be able to switch voice into modem DSP 82. Referring now to FIG. 4, the speaker portion of headset 100 is connected via wires 95 and 96 to output wires 78 and 79 of DSP 82. The microphone portion of headset 100 is connected via wires 97 and 98 to input wires 80 and 81 of DSP 82. DSP 82 performs analog to digital and digital to analog conversion functions on the voice signals and passes along the signals via microcontroller 86 to host 104. The intelligence for handling the record and playback functions resides in the application software in host 104.

Figure 5:
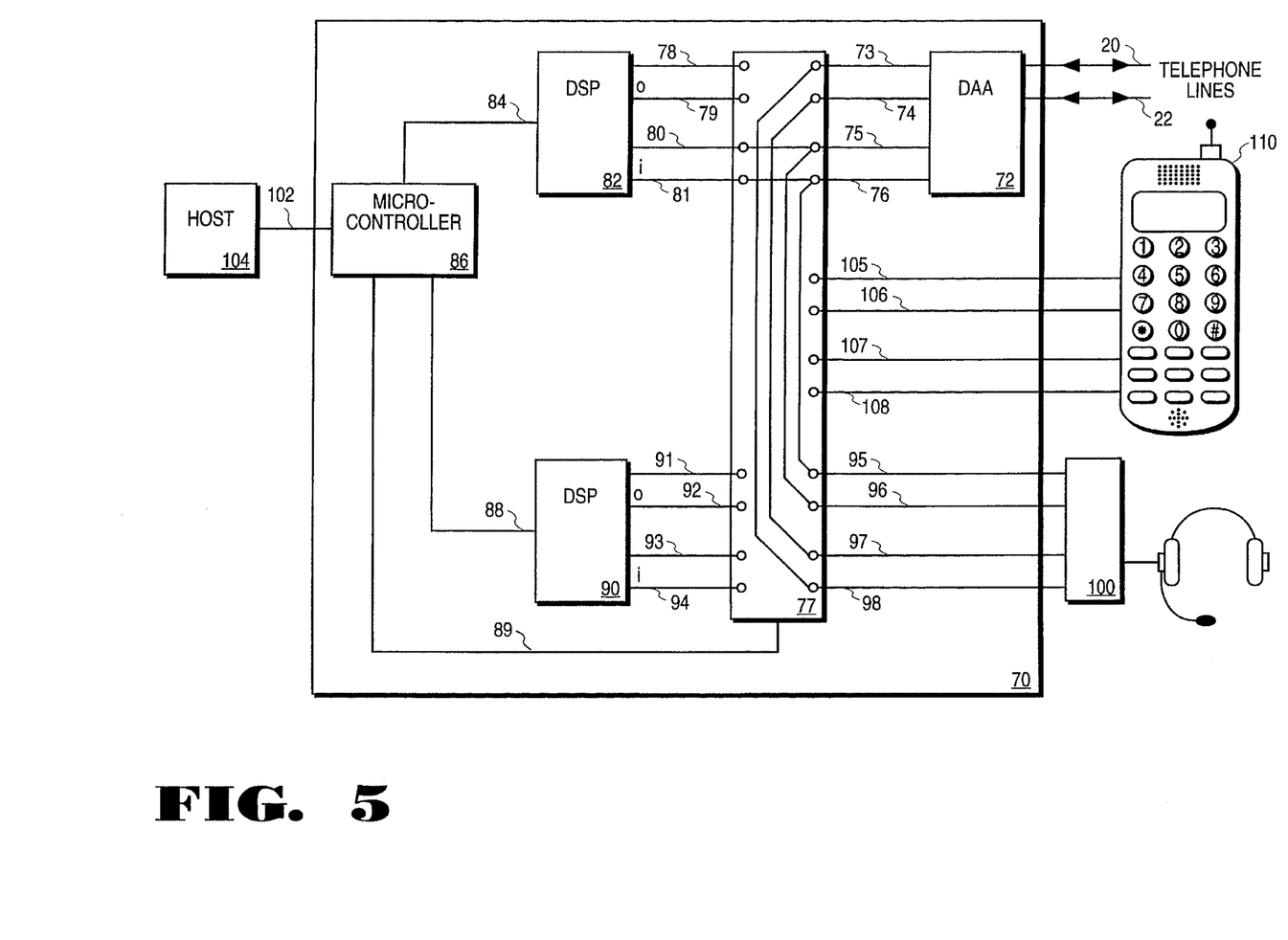
FIG. 5 is a block diagram of the system of the present invention when connected to provide Radish—voice mode features.
Figure 6:
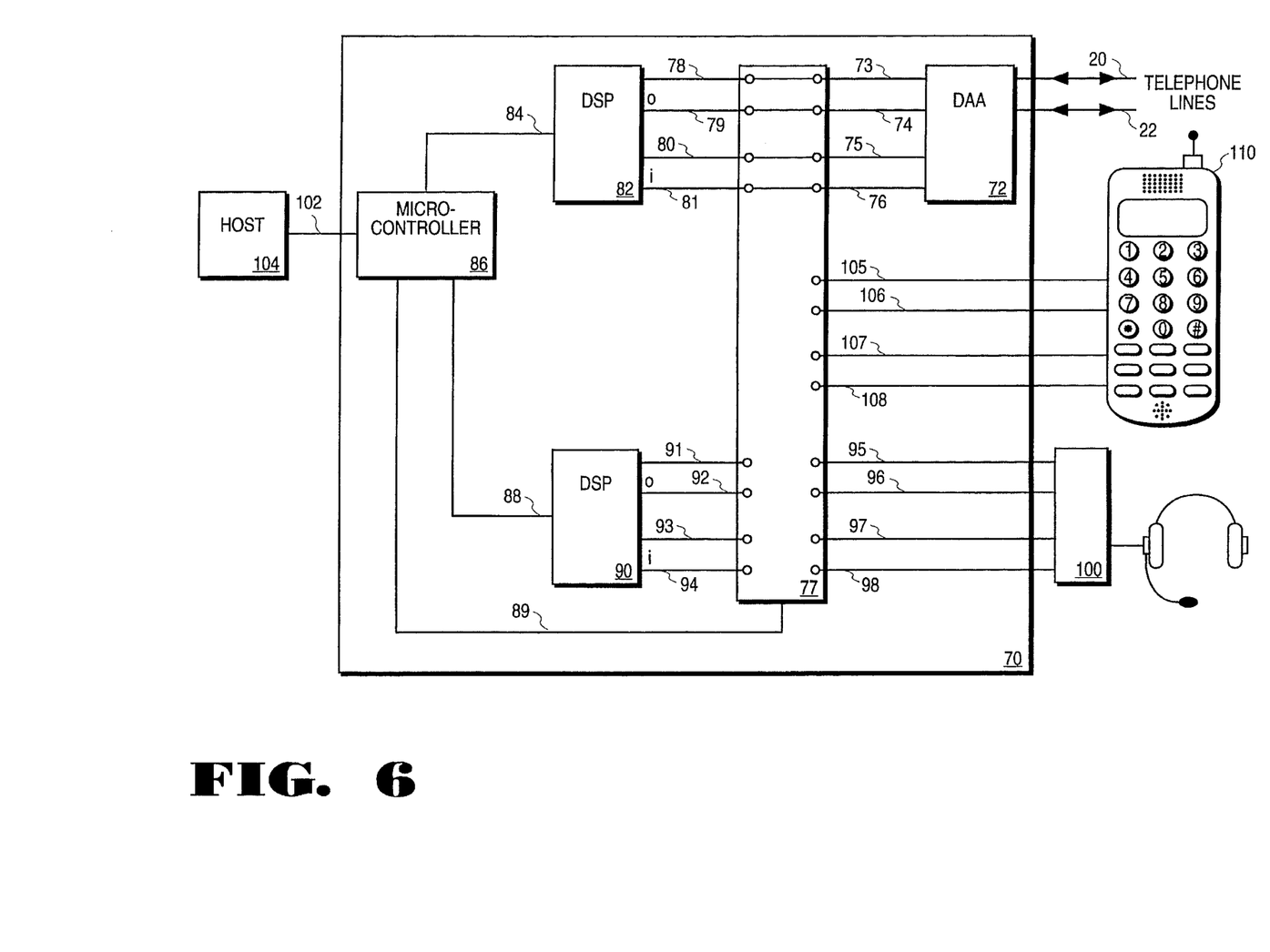
FIG. 6 is a block diagram of the system of the present invention when connected to provide Radish—data mode features.

Radish emulation mode consist of two sub-modes: voice sub-mode and Radish data sub-mode. FIG. 5 is a block diagram of the configuration of switch 77 in the voice sub-mode and FIG. 6 is a block diagram of the configuration of switch 77 in the data sub-mode. In the voice sub-mode, both DSP 82 and DSP 90 add very little functionality. Indeed, the only function that they perform is that DSP 82 listens for the tone that is part of the Radish protocol that signals the modem to switch from voice to data. Referring now to FIG. 5, the speaker portion of headset 100 is connected vial wires 95 and 96 to wires 75 and 76 which are the output of DAA 72. Also, input wires 75 and 76 from DAA 72 are connected to input wires 80 and 81 of DSP 82. The microphone portion of headset 100 is connected via wires 97 and 98 to input wires 73 and 74 of DAA 72.

In the data sub-mode, as illustrated by FIG. 6, the data goes straight through and the voice is disconnected. This is equivalent to the modems that are in most common use today. Referring now to FIG. 6, the output of the four wire side of DAA 72 is connected via wires 75 and 76 to input wires 80 and 81 of DSP 82, and the output of DSP 82 is connected via output wires 78 and 79 and wires 73 and 74 to the input of the four wire side of DAA 72.

Figure 7:
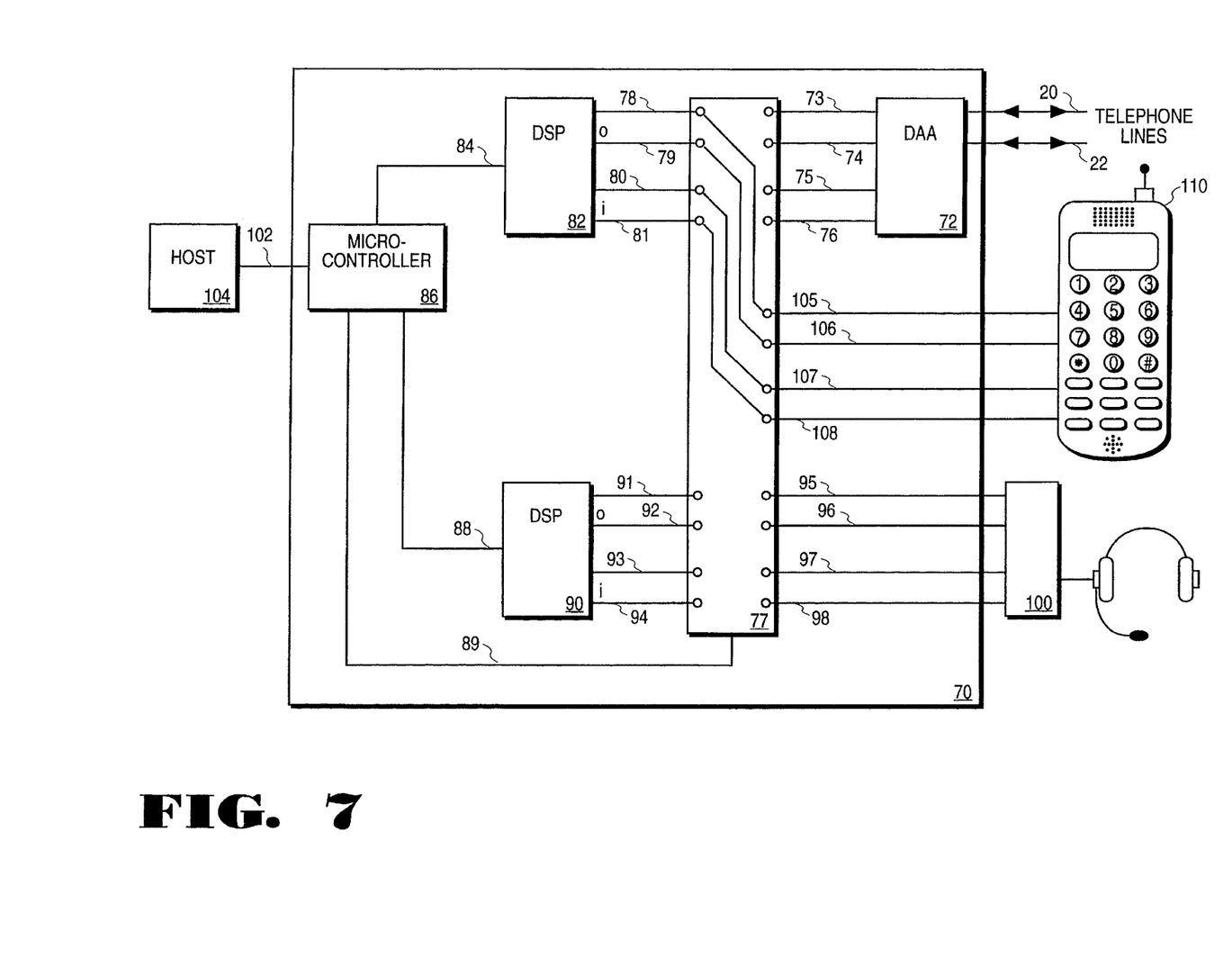
FIG. 7 is a block diagram of the system of the present invention when connected to provide cellular transmission mode features.

Cellular mode configures the modem to communicate over the cellular telephone network. This network is different than the ground based telephone network in certain respects one of which is that a DAA is not used. FIG. 7 is a block diagram illustrating the cellular telephone and POTS connections and the reason for requiring a separate cellular mode arrangement in switch 77. Referring now to FIG. 7, cellular telephone 110 takes the place of headset 100, and is connected to switch 77 by output wires 95 and 96 and by input wires 97 and 98. The signal to be sent out over cellular telephone or POTS is the same signal before reaching switch 77. However separate connections are required for the following reason. Suppose that a user has their cellular telephone connected to modem 70, but that the user uses a POTS line instead of the cellular telephone. If a parallel connector were used, then a cellular telephone that was turned off would be connected to the wires leading to the DAA causing the signal to the DAA to be corrupted. That is, there is a potential for not getting a signal out to the telephone wire since turning the cellular telephone off while it is connected to the modem is equivalent to grounding the cellular telephone line. Accordingly, the switch of the present invention is configured to provide isolation for the case where the user connects their cellular telephone to the modem, but simultaneously connects the modem to POTS. There will be sufficient connectors on future implementations of PCMCIA cards to create this problem. Referring now to FIG. 7, the output of cellular telephone 110 is connected via wires 97 and 98 and switch 77 to wires 80 and 81 of DSP 82, and the output of DSP 82 is supplied via wires 78 and 79, switch 77 and wires 95 and 96 to the input to cellular telephone 110.

Figure 8:
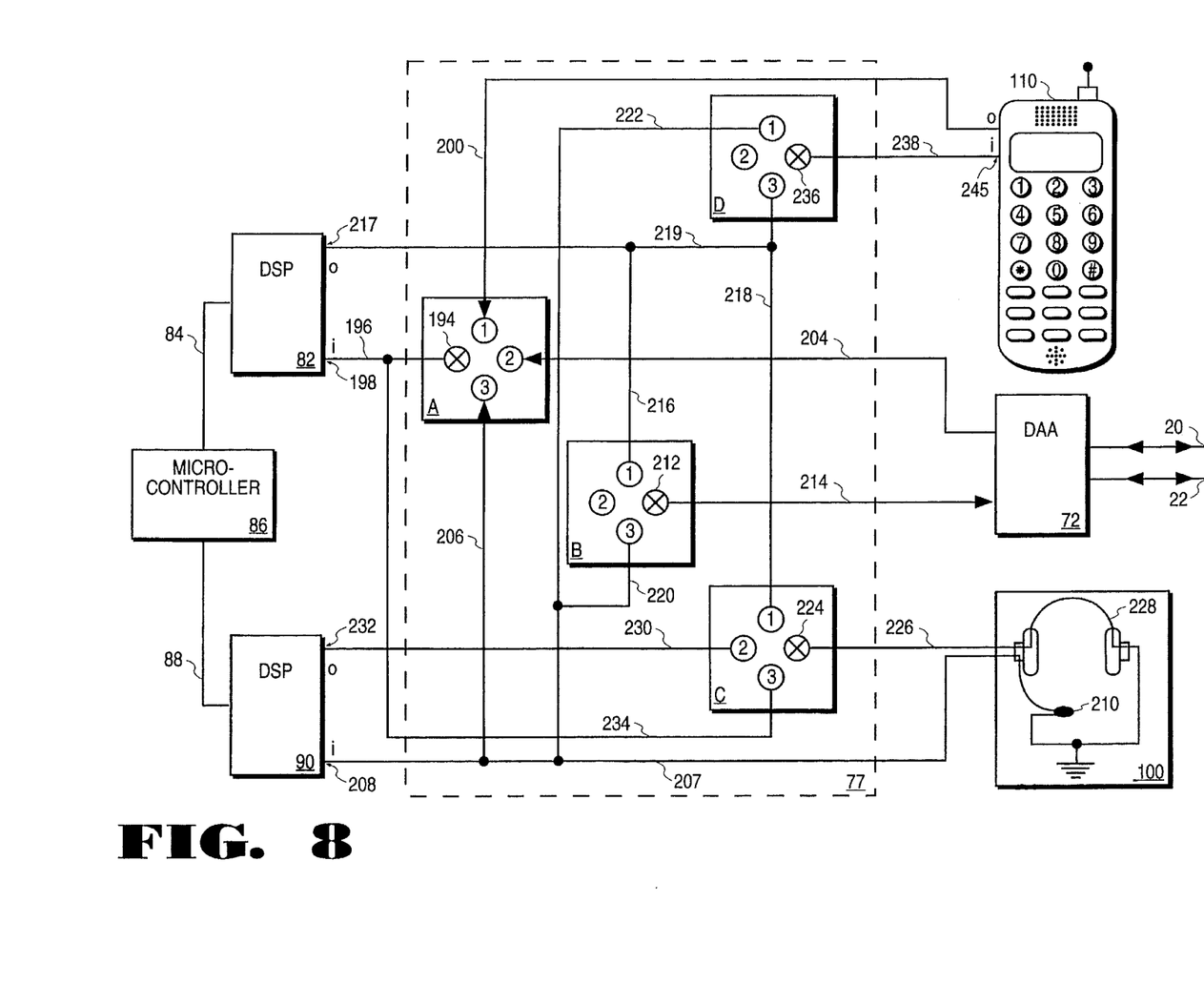
FIG. 8 is a block diagram of the switch of the present invention.

FIG. 8 is a schematic representation of the switching that must be accomplished to implement the described modes. The schematic of FIG. 8 is shown as a single ended (signal and return) as opposed to a differential (plus signal, minus signal and return) schematic for simplicity and ease of understanding. Thus all data paths appearing in FIG. 8 as a single line are in reality a unidirectional signal wire and a ground wire.

Referring now to FIG. 8, switch A has a base terminal 194 and terminals labeled 1, 2 and 3 and hereafter referenced as A1, A2 and A3. Base terminal 194 can be connected under computer control to any one of terminals A1, A2 or A3; however connections are mutually exclusive. Base terminal 194 is connected by data path 196 to the analog input terminal 198 of DSP 82. It is also connected via data path 234 to terminal C3. Data path 196 carries analog signals coming into DSP 82 of modem 70. Terminal A1 is connected via data path 200 to cellular telephone 202. Data path 200 carries incoming analog signals from the cellular network through cellular telephone 202 to modem 70. Terminal A2 is connected via data path 204 to the analog output of the four wire side of DAA 72. Data path 204 carries incoming analog signals from DAA 72 to modem 70. Terminal A3 is connected by data path 206 and 207 to analog input 208 of DSP 90 and microphone 210 of headset 100. Data paths 206 and 207 carry incoming voice analog data from microphone 210 in headset 100.

Switch B has a base terminal 212 and terminals labeled 1, 2 and 3 and hereafter referenced as B1, B2 and B3. Base terminal 212 can be connected under computer control to any one of terminals B1, B2 or B3; however connections are mutually exclusive. Base terminal 212 is connected by data path 214 to the analog input terminal of the four-wire side of DAA 72. Data path 214 carries outgoing analog signals to DAA 72. Terminal B1 is connected via data path 216 and data path 219 to analog output 217 of DSP 82. Terminal B1 is also connected by data path 218 to terminals C1 and D3. Data path 216 and data path 219 carries outgoing analog signals from DSP 82 through switch B to DAA 72. Terminal B2 is unconnected and therefore null. This position corresponds to "off" which means that if B2 is selected, no signal appears on base terminal 212. Terminal B3 is connected by data path 220 to the common point between analog input 208 of DSP 90 and microphone 210 of headset 100. Terminal B3 is also connected by data path 222 to terminal D1. Data paths 220 and 222 carry incoming voice analog data from microphone 210 in headset 100. Base terminal 212 can be connected to either terminal B1, B2 or B3; however connections are mutually exclusive.

Switch C has a base terminal 224 and terminals labeled 1, 2 and 3 and hereafter referenced as C1, C2 and C3. Base terminal 224 can be connected under computer control to any one of terminals C1, C2 or C3; however connections are mutually exclusive. Base terminal 224 is connected by data path 226 to head phone 228 of headset 100. Terminal C1 is connected via data path 218 to the analog output 217 of DSP 82. Terminal C1 is also connected by data path 218 to terminal D3 and by data paths 218 and 216 to terminal B1. Terminal C2 is connected by data path 230 to analog output 232 of DSP 90. Terminal C3 is connected by data path 234 to the common point between analog input 198 of DSP 82 and base terminal 194 of switch A. Data path 234 carries the analog output signal from DAA 72 (through switch A) or cellular telephone 202 to headset 228.

Switch D has a base terminal 236 and terminals labeled 1, 2 and 3 and hereafter referenced as D1, D2 and D3. Base terminal 236 can be connected under computer control to any one of terminals D1, D2 or D3; however connections are mutually exclusive. Base terminal 236 is connected by data path 238 to the analog input terminal 240 of cellular telephone 110. Data path 200 carries output analog signals from cellular telephone 110 to switch A. Terminal D1 is connected via data paths 222 and 207 to the common point between analog input 208 of DSP 90 and microphone 210. Terminal D1 is also connected by data path 220 and data path 222 to terminal B3. Terminal D2 is unconnected and therefore null. This position corresponds to "off" which means that if D2 is selected, no signal appears on base terminal 236. Terminal D3 is connected by data path 218 and 219 to analog output 217 of DSP 82. Terminal D3 is also connected by data path 216 to terminal B1 and by data path 218 to terminal C1.

In operation, the switch of FIG. 8 works as follows. Switch A connects input 198 of DSP 82 to three sources of signals: cellular telephone 110, DAA 72 and microphone 210 of headset 100. Note that headset is not a standard phone because a standard phone contains a DAA. Switch A also connects terminal C3 with the same three signal sources. When switch A is in position A1, the output of cellular telephone 110 is connected to the input of DSP 82. This position is selected when using a cellular telephone. When switch A is in position A2, the output of DAA 72 is connected to the input of DSP 82. This position is selected for POTS modes. When switch A is in position A3, the output of headset 100 is connected to input 217 of DSP 82. This position is used for business/audio announcement recording. Thus, switch A controls the line input into the modem DSP and switches between cellular, business audio or telephone.

Switch B takes signals from two sources: the output of DSP 82 and the output of headset 100. Switch B controls the input to the four-wire input of DAA 72. When switch B is in position B1, the output of DSP 82 is connected to the input of DAA 72. This position is selected for Radish data mode emulation and business/audio mode. When switch B is in position B2, nothing is connected to the four-wire input of DAA 72. This position is selected for cellular-mode. When switch B is in position B3, the output of headset 100 is connected to the four-wire input of DAA 72. This position is used for Radish voice mode. Thus, switch B controls the line input into the DAA and switches between the microphone 210 and DSP 82 output.

Switch C takes signals from three sources: the output of DSP 90, the output of DAA 72 (through switch A) and the output of DSP 82. When switch C is in position C1, the output of DSP 82 is connected to headphone 228. This position is selected for business/audio. When switch C is in position C2, the output of DSP 90 is connected to headphone 228. This position is selected for Radish data emulation and DSVD mode. When switch C is in position C3, the output of DAA 72 is connected through switch A to headphone 228. This position is used for Radish voice emulation. Thus, switch C controls the input to headphone 228. It switches between DSVDmode and Radish data mode, and business/audio and Radish voice mode Switch D takes signals from two sources: the output of DSP 82 and microphone 210 of headset 100. When switch D is in position D1, the output of headset 100 is connected to the input of cellular telephone 110. This position is selected for cellular Radish voice emulation mode. When switch D is in position D2, nothing is connected to the input of cellular telephone 110. This position is selected for POTS mode. When switch D is in position D3, the output of DSP 28 is connected to cellular telephone 110. This position is used for cellular Radish data mode emulation and business/audio mode. Thus, switch D controls the input to cellular telephone 110 and switches between headset 100 and the output of DSP 82.

Five control signals are needed to control the four switches of FIG. 8. These signals are generated by microcontroller 86. The connections are not shown in FIG. 8. The five control signals are Bus/Audio:
  An active high signal indicating that business audio mode is active.
Radish Voice:
  an active high signal indicating that the headset is connected.
Radish Data:
  an active high signal indicating that the downline telephone is connected.
Cellular:
  an active high signal indicating that the downline telephone is a cellular telephone.
POTS:
  an active high signal indicating that the downline telephone is a Plain Old Telephone System The condition of the control signals required to implement the desired modes are set out in Table 1. Referring now to Table 1, the modes are the headings for the columns and the switches are the headings for the rows. A "1" in a box indicates that the switch on that line is selected to that column. A "0" indicates that the switch is not selected. For example, if the cellular, RAD V (Radish Voice) is the desired mode, switches A1 and B2 and C3 and D3 are selected. This is indicated in Table 1 by the "1" in the RAD V column next to the selected switches. In like manner, if business/audio is the desired mode, switches A3 and B2 and C1 and D2 are selected. Rad V means Radish voice. Rad D means Radish data.

TABLE 1

| | | MODES | | | | |
|---|---|---|---|---|---|---|
| | | CELLULAR | | POTS | | |
| SWITCH | TERM-INAL | RAD V | RAD D | RAD V | RAD D | B/A |
| A | A1 | 1 | 1 | 0 | 0 | 0 |
| | A2 | 0 | 0 | 1 | 1 | 0 |
| | A3 | 0 | 0 | 0 | 0 | 1 |
| B | B1 | 0 | 0 | 0 | 1 | 0 |
| | B2 | 1 | 1 | 0 | 0 | 1 |
| | B3 | 0 | 0 | 1 | 0 | 0 |
| C | C1 | 0 | 0 | 0 | 0 | 1 |
| | C2 | 0 | 1 | 0 | 1 | 0 |
| | C3 | 1 | 0 | 1 | 0 | 0 |
| D | D1 | 1 | 0 | 0 | 0 | 0 |
| | D2 | 0 | 0 | 1 | 1 | 1 |
| | D3 | 0 | 1 | 0 | 0 | 0 |

Figure 9:
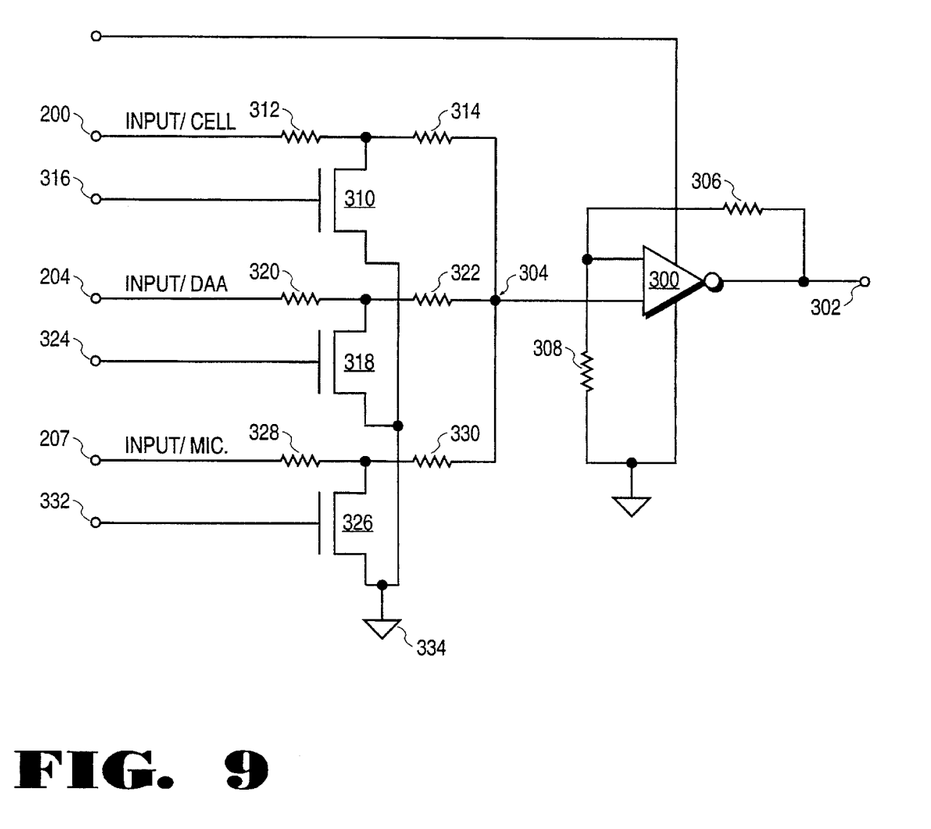
FIG. 9 is a circuit schematic of switch A of FIG. 8.

FIG. 9 is a schematic of an actual implementation of switch A of FIG. 8. Referring now to FIG. 9, switch A is built around operational amplifier 300 which has an output 302 and input 304 and gain control resistors 306 and 308. Input 304 of operational amplifier 300 is connected to three input field effect transistors ("FET") 310, 318 and 326. FET 310 has input resistors 312 and 314 connected to its source and gate 316. The drain of FET 310 is connected ground 334. FET 318 has input resistors 320 and 322 connected to its source and its drain is connected to ground 334. Terminal 324 is the gate. FET 326 has input resistors 328 and 330 connected to its source and ground 334 connected to its drain. Terminal 332 is the gate.

FET 310 corresponds to switch A1; FET 318 corresponds to switch A2 and FET 326 corresponds to switch A3 in FIG. 9.

FET's 310, 318 and 326 conduct when the signal on their respective gates is high. Thus when the signal on the gate is high, the mid-point between the two input transistors is shorted to ground 334. Thus, to select a particular input, the FET connected to the input to be selected is turned off and the other two FETs turned on. In this way only the input signal to the FET that is turned off reaches input 304 of operational amplifier 300. Resistors 306 and 308 determine the gain of the switch and are typically set to produce a total gain of 1.

The signals on gates 316, 324 and 332 needed to achieve the proper switching are set out in Table 1.

Switches B, C and D may be implemented in a similar fashion as to switch A shown in FIG. 9.

It will be appreciated from the foregoing that the preferred embodiment is subject to numerous adaptions and modifications without departing from the scope of the invention. Therefore, it is to be understood that, within the scope of the appended claims, the invention may be practiced other than as specifically described herein.

What is claimed is:

1. A switching multi-mode modem comprising:

a DAA having a two-wire side and a four-wire side, said two-wire side being connected to a land based telephone network;

a first DSP capable of performing all modem digital signal processing functions;

a second DSP capable of performing conversion and compression of analog voice signals to digital signals;

a headset connector;

a cellular telephone connector;

a switching network connected between said first DSP, said second DSP, said four-wire side of said DAA, said cellular telephone and said headset; and a microprocessor means communicating with said first DSP and said second DSP and said switching network, said microprocessor means being adapted to separate audio signals from data signals and to cause said switching network to switch into states that configure said modem to operate a plurality of separate modes.

2. The switching multi-mode modem system of claim 1 wherein one of said modes is Radish data.

3. The switching multi-mode modem system of claim 1 wherein one of said modes is Radish voice.

4. The switching multi-mode modem system of claim 1 wherein one of said modes is simultaneous voice and data.

5. The switching multi-mode modem system of claim 1 wherein one of said modes is cellular telephone.

6. The switching multi-mode modem system of claim 1 wherein one of said modes is business/audio.

7. The switching multi-mode modem system of claim 1, wherein said microprocessor means resides in a host computer to which said modem is attached.

8. The switching multi-mode modem system of claim 1, wherein said microprocessor means consists of a microprocessor located in said modem.

9. A switching multi-mode modem comprising:

a DAA having a two-wire side with an input and output and a four-wire side with an input and output, said input and output on said two-wire side being connected to a land based telephone network;

a first DSP having an input and output and capable of performing all modem digital signal processing functions;

a second DSP having an input and output and capable of performing conversion of analog voice signals to digital signals and compression of said digital voice signals;

a headset having an input and output;

a cellular telephone having an input and output;

a first switch having a base terminal connected to said input of said first digital signal processor and mutually exclusively connectable to three switchable terminals, said first switchable terminal being connected to said output of said cellular telephone, said second switchable terminal being connected to said output of said four wire side of said DAA, and said third switchable terminal being connected to said output of said headset;

a second switch having a base terminal connected to said input of said four wire side of said DAA and mutually exclusively connectable to three switchable terminals, said first switchable terminal being connected to said output of said first digital signal processor, said second switchable terminal being off for said second switch and said third switchable terminal being connected to said output of said headset;

a third switch having a base terminal connected to said input of said headset and mutually exclusively connectable to three switchable terminals, said first switchable terminal being connected to said output of said first digital signal processor, said second switchable terminal being connected to said output of said second digital signal processor, and said third switchable terminal being connected to said input of said vase terminal of said first switch;

a fourth switch having a base terminal connected to said input of said cellular telephone and mutually exclusively connectable to three switchable terminals, said first switchable terminal being connected to said output of said headset and said second terminal of said second switch, said second switchable terminal being off for said fourth switch and said third switchable terminal being connected to said output of said first digital signal processor, to said first terminal of said second switch and to said first terminal of said third switch; and microprocessor means communicating with said first DSP and said second DSP and to said first, second, third and fourth switches, said microcontroller being adapted to separate audio signals from data signals and to cause said first, said second, said third, and said fourth switches to switch into states that configure said modem to operate in a Radish voice mode, or a Radish data mode, or a cellular telephone mode, or a business/audio mode or a digital simultaneous voice and data mode upon command from said microcontroller.

10. The switching multi-mode modem system of claim 9 wherein said microprocessor means resides in a host computer to which said modem is attached.

11. The switching multi-mode modem system of claim 9 wherein said microprocessor means consists of a microprocessor located in said modem.

12. The switching multi-mode modem system of claim 9 wherein the states of said switches as follows:

are required to achieve said Radish voice mode, or a Radish data mode, or a cellular telephone mode, or a business/audio mode or a digital simulataneous voice and data mode upon command from said microcontroller.

* * * * *

UNITED STATES PATENT AND TRADEMARK OFFICE
CERTIFICATE OF CORRECTION

| | | |
|---|---|---|
| PATENT NO. | : | 5,602,902 |
| DATED | : | February 11, 1997 |
| INVENTOR(S) | : | Satterlund et al. |

It is certified that error appears in the above-identified patent and that said Letters Patent is hereby corrected as shown below:

In column 8 at line 59 insert --implement the mode in-- following "to" and prior to "that"

Signed and Sealed this

Twentieth Day of May, 1997

Attest:

BRUCE LEHMAN

*Attesting Officer*                *Commissioner of Patents and Trademarks*